Nov. 22, 1938.   H. KOPPERS   2,137,723
APPARATUS FOR THE CONTINUOUS PRODUCTION OF WATER GAS
Filed June 10, 1936   3 Sheets-Sheet 1

Nov. 22, 1938.　　　　　H. KOPPERS　　　　　2,137,723
APPARATUS FOR THE CONTINUOUS PRODUCTION OF WATER GAS
Filed June 10, 1936　　　3 Sheets-Sheet 3

Inventor:
Heinrich Koppers
By Henry Love Clark
his atty

Patented Nov. 22, 1938

2,137,723

UNITED STATES PATENT OFFICE 2,137,723

APPARATUS FOR THE CONTINUOUS PRODUCTION OF WATER GAS

Heinrich Koppers, Essen, Germany, assignor, by mesne assignments, to Koppers Company, Pittsburgh, Pa., a corporation of Delaware Application June 10, 1936, Serial No. 84,398
In Germany June 13, 1935

4 Claims. (Cl. 48—73)

The invention relates to the continuous production of water gas or other gases consisting of hydrogen and carbon oxides from reactive fuel such as lignite, brown coals, bituminous non-caking coal, wood, cocoanuts or any other suitable substances containing carbon.

It is well-known to produce water gas in a continuous stream by treating fuel with a hot mixture of water gas and steam. The proportion of water gas in this mixture depends on the quantity of heat which is transferred to the fuel for maintaining the reaction between steam and carbon, i. e. the water gas reaction. The hot mixture of water gas and steam acting as a heat transferring medium is prepared by drawing off from the water gas developed in the fuel, a part thereof as a partial stream and by adding to this partial stream the desired quantity of water, in case the partial stream of water gas does not contain that quantity of water which is necessary for maintaining the water gas reaction. The mixture of water gas and steam is then introduced into a suitable gas heater, for instance a regenerator.

In this gas heater, the mixture is heated up to a high temperature, for instance to 1250 degrees centigrade and is then introduced into the fuels, which may be for instance in a suitable chamber or shaft furnace, constructed of heat resisting material, for instance refractory material. By combining the shaft furnaces or gas producing chambers for instance with two regenerators, it is possible to introduce a hot mixture of water gas and steam uninterruptedly into the fuel charge, so that water gas is uninterruptedly rather than intermittently produced.

The main object of my present invention is to provide such improvements in the continuous production of water gas or other gases so that the continuous production is effected with a high efficiency of the water gas reaction.

For this purpose, according to my present invention, I provide as the gas producing chamber a rectangular chamber constructed of refractory material and provided with closeable openings at the top and at the bottom for introducing fuel at the top and for drawing off the residue at the bottom respectively. Inside the reaction chamber are arranged a row of bridge-like channels between the longer sides of the chamber, said bridges being constructed preferably of refractory material or another suitable heat resisting material. These bridges according to my present invention are used as elements for introducing the hot mixture of water gas and steam into the fuel charge inside the gasification chamber. Between the bridges are spaces for drawing off the residue left over from the decarbonized fuel. The bridges are for this purpose provided with channels and suitable openings. The bridge-like channels are connected to main channels provided in the outer or inner walls of the gasification chamber at a level below or above the bridges, so that the bases for the bridges may be provided in the chamber walls.

Other essential features and objects of my present invention may be taken from the following description of a preferred embodiment of my present invention.

When operating the plant according to my present invention, the gases to be circulated between the gasification chamber and the gas heater may be drawn off from the gas producer with a more or less high content of hydrocarbons or tarry constituents. Preferably I separate from the gases only the tarry matter which is present in the state of suspension, whilst the hydrocarbons in a vapour-phase may remain in the gases. These hydrocarbons will then interact with the steam in the gas heater or in the high temperature zones of the gasification chamber, whereby the hydrocarbons are converted into hydrogen and carbon oxides. I believe that this feature of my present invention is very advantageous in all cases where water gas formed from hydrocarbons is to be produced from bituminous fuels, such as lignite or brown coal, since all hydrocarbons are converted into hydrogen and carbon oxides.

This method of operation according to my invention is especially advantageous in the water gas production and is used for the pyrolysis of hydrocarbons to form H and CO for the synthesis thereof by the catalytic reaction of the hydrogen and carbon monoxide continuously concurrently with the heating up of the fuel bed.

Figure 6:
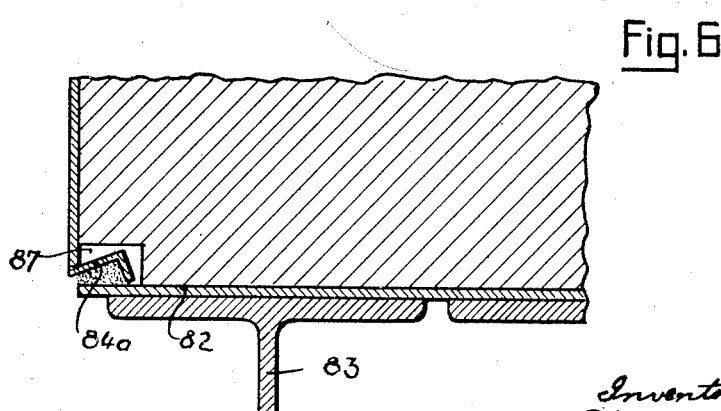

Fig. 6 finally shows a corner connection of the jacket.

Figure 1:
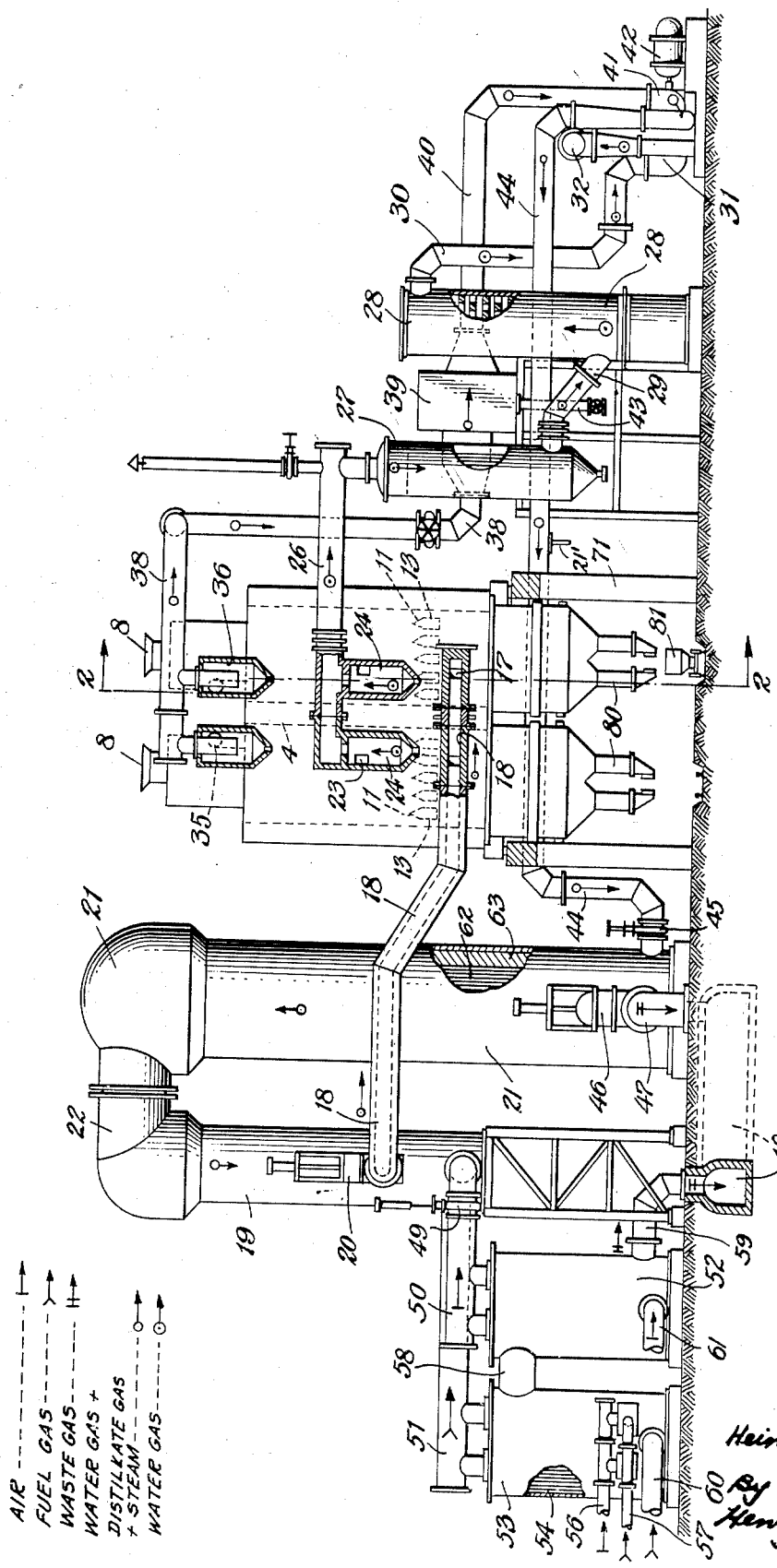
Fig. 1 shows a side elevational view partly in vertical section of a plant for the continuous production of water-gas.

In the plant as shown in Fig. 1, a gas producer 1 serves for receiving the fuel to be gasified. Preferably a so-called easily reactive fuel shall be used, for instance brown coal, lignite, bituminous non-caking coal, wood, shells of cocoanuts or any other suitable fuel containing carbon. In gas producer 1, the fuel is brought into contact with a highly heated mixture consisting of water-gas and steam. The hot gas steam mixture thus warms up the fuel to such a high temperature, that by the reaction of the steam with the carbon, hydrogen and carbon oxides, i. e. watergas, are formed.

Figure 2:
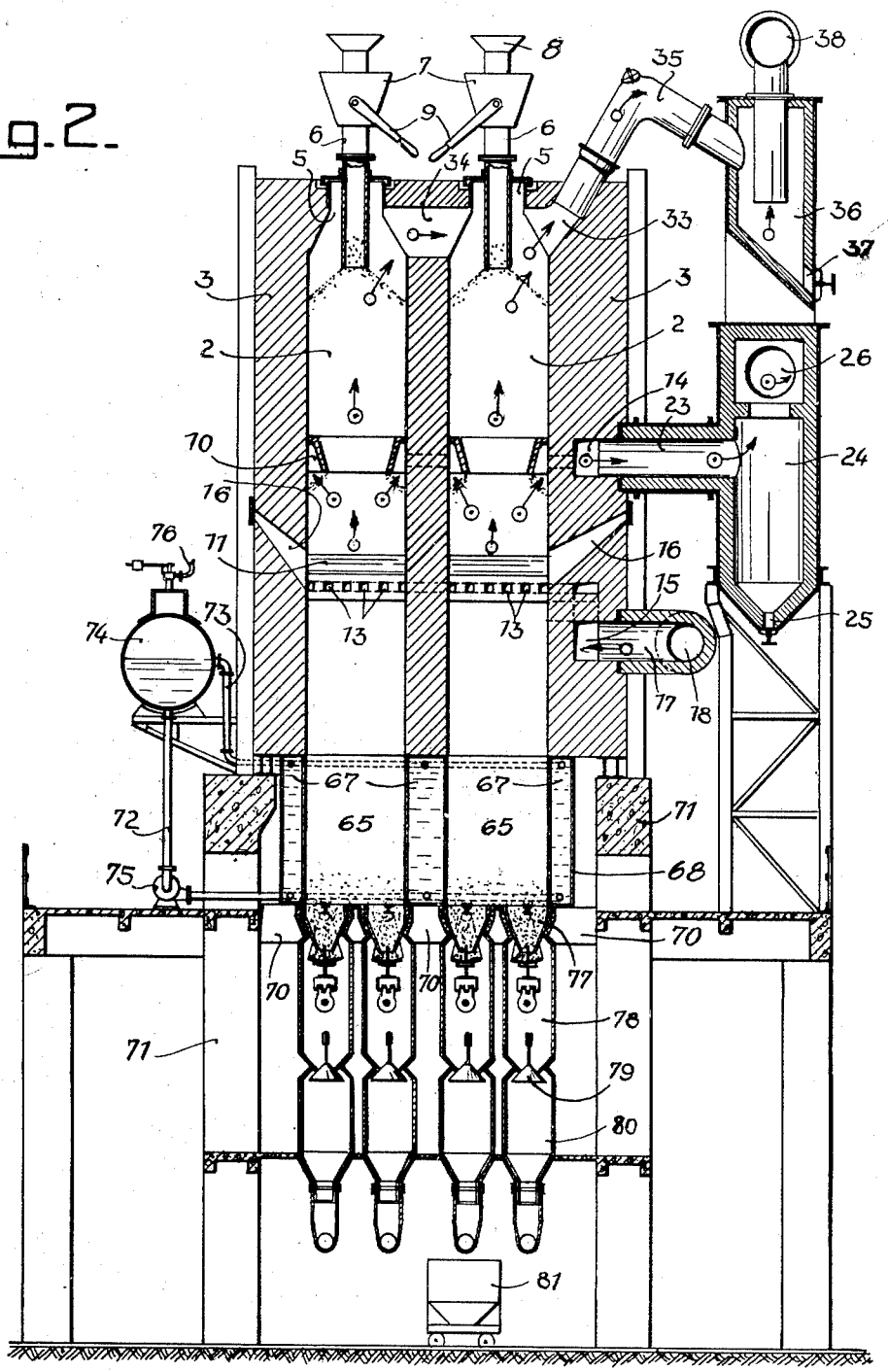
Fig. 2 shows on an enlarged scale a vertical section through the gas producer itself on line 2—2 of Fig. 1.
Figure 3:
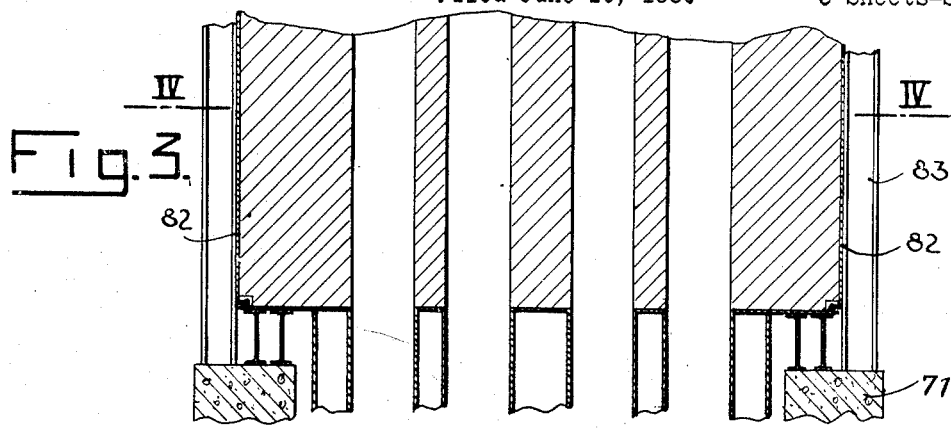
Fig. 3 shows on an enlarged scale a vertical section through the lower part of the gas producer.
Figure 4:
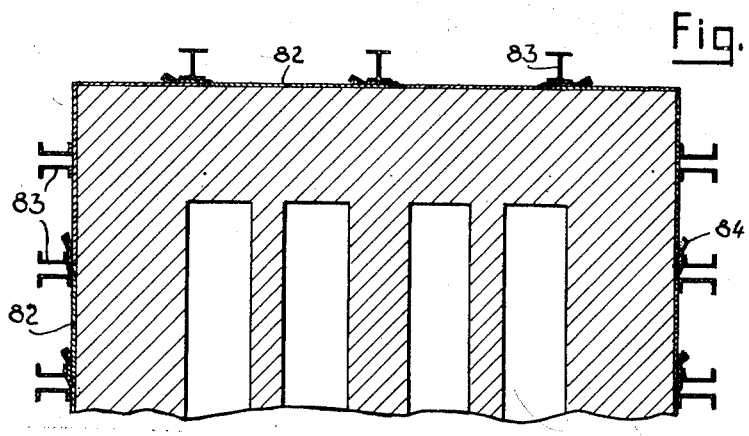
Fig. 4 is a horizontal section on line IV—IV of Fig. 3.
Figure 5:
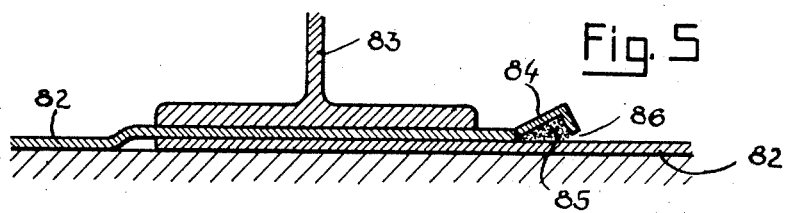
Fig. 5 shows on an enlarged scale a vertical section through a connecting point of the jacket of the gas producer.

The construction of the gas producer 1 is more fully detailed in Fig. 2.

The gas producer consists of two rectangular shafts or chambers, 2, which are formed by the outer walls 3 and the partition wall 4, all walls being constructed of refractory brickwork.

Two openings 5 are provided for each chamber in the ceiling of the gas producer. A charging pipe 6 is inserted in a gas-tight way through each of these openings into each of the gasification chambers 2. A suitable charging device 7 is connected in a gas-tight manner, outside of the charging pipe 6, into which the fuel can be filled in through the hopper 8. By manipulating the hand lever 9 a shut-off valve provided inside the charging device 7 can be opened so that the fuel from the charging device 7 may fall into the charging pipe 6. The charging device 7 is essentially similar in design to the well-known charging devices for gas producers.

In the rectangular shafts 2 there are provided a row of bridges 11, made of refractory material. In Fig. 1 these bridges 11 have been shown in dashed lines. The bridges 11 have the shape of ridges at the top.

Inside the bridges 11 there are provided longitudinal channels, which are in connection with the gasification chambers 2 through the openings 13. All the longitudinal channels or a group of same in the bridges 11 communicates with the wall channels 15, which are arranged in one or in both external walls 3 or in the partition wall 4 of the gas producer. The channels 15 are situated at a lower level than the bridges 11. Thereby it is rendered possible to provide solid parts of brickwork in the external walls 3 which serve as an abutment for the bridges 11. Moreover, the special position of the channels 15 relative to the bridges 11, makes provision for the arrangement of closable poking holes 16, through which, by means of rods or any other suitable tools, the fuel bed in space between the bridges 11 can be poked. By the arrangement of these poking holes it is possible to remove the slag from between the bridges 11 or to crush it so that it can be discharged downward through the spaces between the bridges 11.

From the channels 15 there lead several channels 17, or only one channel to the outside of the producer. The channels 17 are connected with a pipeline 18 lined with refractory materials. As may be seen from Fig. 1, the pipeline 18 runs over the whole length of the gas producer 1. The pipeline 18 leads to a vertical shaft 19, made out of refractory material. The connection of the pipeline 18 with shaft 19 can be interrupted by a valve 20 or another suitable closing element, which is able to withstand high temperatures. At the upper end at point 22 the shaft 19 is in connection with the upper end of the tower-like gas heater 21, designed essentially like well-known Cowpers heater used for heating air in the blast furnace-process. A surrounding wall projection 10 has been provided above the bridges 11 in every chamber 2 to form a channel which is connected with a wall-channel 14. Instead of a wall channel 14 those channels can if necessary also be provided in both outer walls 3 and/or in the partition wall 4. Instead of the wall projections 10 it is also possible to provide rows of bridges similar to the bridges 11.

The gases escaping through the channels 14 contain often large quantities of dust which have to be removed before the gas can be further dealt with. The dust precipitates in the dust separators 24 and is discharged at the bottom of the separating chambers through the closable openings 25. A pipeline 26 leads from the dust separators to the steam boiler 27, or to another suitable heat exchanger, in which the hot gases give off their heat. From the steam boiler 27 the cooled gases pass through the pipeline 29 to a scrubber 28 in which the gases are treated with hot and/or cold water and are thus freed from the last traces of dust and other undesired impurities. The scrubber 28 is in connection with a gas exhauster or fan 31 by means of the pipeline 30. From the exhauster 31 the purified and cooled gas can be drawn off through the pipeline 32 for further use.

In the ceiling of the gas producer another opening 33 is arranged, near the fuel charging openings 6. The gases from the upper part of the gas producer can be discharged through this port. For this reason a connecting opening 34 is arranged in the middle partition wall between the chambers 2. Instead of this it is however possible to provide a special gas outlet opening 33 for each of the chambers 2.

A pipeline 35 is connected to the gas outlet opening 33, which pipeline leads to a dust-separator 36. The dust removed from the gas in the separator 36 can be eliminated through the closable opening 37. From the dust separator 36 a pipeline 38 leads to a tar removal arrangement 39, for instance to an electrostatic tar precipitator. The pipeline 38 and the dust extractor 36 are preferably lined with an heat insulating material, so that the gases cannot be cooled down there. From the tar precipitator 39 a pipeline 40 leads to the gas exhauster or fan 41. This line 40 leads to the gas exhauster or fan 41. This gas exhauster 41 is suitably directly coupled with the gas exhauster 31, so that both gas exhausters can be driven by one motor 42.

The tar or other constituents from the gas precipitating in the tar removal arrangement 39 can be drawn off through the closable pipeline 43.

A pipeline 44 leads from the gas exhauster 41 by the interconnection of a gas valve 45 to the lower end of the gas heater 21.

The lower end of the gas heater 21 is also connected with a waste gas flue 48 by means of a pipeline 47 governed by the shut-off valve 46, which flue leads to a chimney not shown on the drawings.

At the lower end of the shaft 19 there are connected pipelines 50 and 51, each having a shut-off valve 49. The pipeline 50 leads from a recuperator 52 and the pipeline 51 leads from a recuperator 53, which serve for preheating air and if necessary also fuel gas. In the inside of the recuperators 52 and 53 there are provided a number of vertical tubes 54, through which are passed the medium to be preheated.

The recuperator 53 is equipped with gas and air burners, which are supplied with fuel gas and air, by the pipelines 56 and 57. The hot combustion gases leaving the burners 55 flow along the outside of the pipes 54 of the recuperator 53, and a part of their heat is transferred to the pipes 54 and thus to the medium flowing through the inside of these pipes. From the upper end of the recuperator 53 the hot combustion gases flow through the connecting line 58 to the upper end of the recuperator 52, which similarly to the recuperator 53 is fitted inside with tubes. The hot combustion gases transfer the rest of the useful heat to the recuperator 52, and finally flow through the pipeline 59 to the flue 48. The recuperator 53 is supplied with fuel gas through the pipeline 60 and the recuperator 52 is supplied with air through the pipeline 61.

The method of operating the plant as shown in Fig. 1 is about the following:

Assuming that all parts of the gas producing plant are heated up to the working temperature, the gas valve 49 at the foot of the shaft 19 may be opened. Preheated air and fuel gas then flow into the shaft 19 at the bottom. The gas valve 20 is closed in this working period, likewise the valve 45. The valve 46 of the gas heater 21 is, however, open. The media introduced into the shaft 19 are burnt there. The hot gases pass through the connecting line 22 into the gas heater 21, and they give their heat to the refractory checker-work 62, which similar to a known Cowper-stove, is surrounded by a refractory brick lining 63.

As soon as the refractory checkerwork 62 of the gas heater 21 has been brought to the desired temperature, up to 1250° C., the gas valves 49 and 46 are closed and the valves 45 and 20 are opened. By means of the blower 41 through the pipeline 44 a mixture of water gas, distillate gas and steam is now introduced from below into the gas heater 21.

The gas steam mixture is warmed by the hot checkerwork in the gas heater to a temperature of about 1150–1200° C. The mixture then flows through the connection 22 into the shaft 19, passes downwards and then goes through the opened pipe line 18 into the channels 15 and into the longitudinal channels of the bridges 11. From these the hot steam-gas mixture flows through the openings 13 into the fuel charge of the gas producer chambers 2. The hot gas-steam mixture gives off its heat to the fuel whereby with such heat there is a reaction of the steam with carbon there is formed water-gas continuously concurrently with the heating up of the fuel. The temperature inside the fuel charge of the gas producer 1 may be about 1000–1100° C., just above the bridges 11. A part of the formed water gas is now removed through the channels 14, by means of the channels beneath the projecting plate 10, from the chambers 2 of the gas producer 1. This part of the gas then flows through the dust separator 24 and then to the steam boiler 27. From there the gas passes to the scrubber 28. The purified and cooled gas can finally be discharged through the pipeline 32 as useful gas.

The remaining gas formed in the lower part of the gasification chambers 2 or which has been introduced there into the chambers, rises upwards through the fuel above the bridges 10. It warms up the fuel which is thereby distilled. The mixture of water gas, distilling gas and steam is drawn off through the openings 33 at the ceiling of the gas producer. The openings 33 are situated above the top layer of the fuel, so that the gases and vapours from the gas producer are essentially drawn off at the temperature inherent to the top layer of the fuel charge.

The gases and vapours then flow through the pipelines 35, the dust separator 36 and the tar precipitator 39. In these contrivances, the dust and tarry constituents contained in the gas only in suspension are separated, whereas the vapour-like constituents especially hydrocarbon and water-vapour and steam are left in the gas. The gas has therefore a temperature which essentially is above the dew point for water-gas, and therefore the gas is charged with water-vapour or steam.

The gas still hot and charged with steam and hydrocarbons is then delivered by means of the blower 41 through the pipeline 44 into the gas heater. Here it is again heated-up so as to flow afresh into the gas producer 1, and to effect here the water-gas reaction. Under certain circumstances, it is moreover advisable to add a certain quantity of steam to the gas before entering the gas heater 21 as indicated at 21'. If the quantity of water formed during the distillation of the fuel is not sufficient for the water gas reaction.

As soon as the temperature of the gas heater 21 has fallen below the point at which the water-gas reaction efficiently takes place, the valves 20 and 45 are closed and the gas heater after opening the valves 49 and 46 is again heated-up.

Thereafter the former cycle of the furnaces is started, so that water gas is again formed continuously concurrently with the heating up of the fuel for the reaction. Instead of connecting the gas producer 1 with one gas heater only, as shown on the drawings, it is also possible and advantageous to connect the gas producer alternatively with two or several gas heaters. In this case an uninterrupted stream of water gas can be permanently taken from the gas producer, as always one of the gas heaters having a high temperature is connected with the gas producer.

The hydrocarbons contained in the circulating gas which is introduced into the gas heaters are converted by the interaction with steam in the gas heater or in the lower part of the gas producer, where exists a high temperature, into hydrogen and carbon oxides. Consequently, the useful water-gas flowing through the channels of the bridges 11 from the gas producer 1 contains practically no hydrocarbons and consists exclusively of hydrogen and carbon oxides.

The residue left over from the gasification of the fuel passes through the spaces between the bridges 11 of the gasification chamber 2 and then flows into the discharging shafts 65, formed by the walls of the gasification chambers. Cooling spaces 67 are connected to the shafts 65. These cooling spaces are formed by water jacket 68 constructed of iron sheet plate or another suitable material and are filled with water. The fuel residues are cooled to the desired temperature in the cooling spaces so that they can be drawn off without the danger of ignition. As may be seen from the drawings, the cooling devices 68 are formed as rectangular boxes. With the mode of carrying out as shown on the drawings, the cooling boxes are further used for supporting the middle part of the brickwork of the gas producer. For this purpose the bottoms of the cooling boxes 68 are placed upon the concrete girders 70, which form a part of the substructure 71 of the gas producer.

The cooling boxes 68 are connected by the pipelines 72, 73, with an evaporator 74, which is placed near the gas producer and above the cooling boxes 68. A pump 75 in the pipeline 72 can be used for keeping the cooling liquid in circulation between the cooling boxes and the evaporator 74. The steam produced in the evaporator can be drawn off through the pipeline 76.

The steam is suitably added to the circulating gas, as indicated conventionally at 21' so as to bring the gas up to the water content which is necessary for the maintenance of the water gas reaction, inside the gas producers. Since the evaporator 74 is situated essentially higher than the cooling boxes 68 and 69, the steam cannot be formed in considerable quantities in the cooling boxes so that no dangerous steam spaces are present within the cooling boxes.

The temperature of the cooling boxes is preferably so adjusted that it is always kept above the dew point of water in accordance with my Patent No. 1,743,717. Thereby condensation of steam or water vapor to water in the fuel residue contained inside the cooling boxes is avoided. This is of special importance, as the fuel residue has under certain circumstances hydroscopic properties similar to cement so that with a penetration or precipitation of water inside the cooling boxes, cement-like lumps of the residue can be formed which prevent a proper discharge of the material from the gas producer.

Below the cooling spaces 67 are connected the hoppers 77 from which the fuel residue can be constantly removed by means of a suitable extractor. The fuel residue discharged from the hoppers 77 goes into an intermediate tank 78, and from there after passing a sealing element 79, into the discharging tank 80, from which the residue can be removed into the transporting vessels 81, as desired. All chambers filled with the fuel residue above the container 80 are built in a gas-tight way, so that no gas from the gas furnace can escape through the discharge mechanism.

A comparatively high pressure is present inside the gas producer 1 during the operation. The gas producer is therefore fitted with special means for avoiding the escape of gas through the brickwork joints or other undesired openings.

For this reason the gas producer, as may be seen in detail from Figs. 3–6 of the drawings, is provided with a jacket consisting of iron sheet plates or another suitable material. This jacket is formed by individual plates 82. At the vertical sides of the gas producer the plates 82 are overlapping as may be seen from Fig. 5. The overlapping ends are held down by the side-buckstays 83 of the gas producer. At every connecting or adjoining point the adjacent plates are fastened, at the end of the outer plate, by an angular iron piece 84 or the like. In the hollow space between the angular extension 84 and the lower plate 82 a suitable packing material, a mixture of graphite and asbestos, is inserted as shown at point 85, in Fig. 5. Under certain conditions it may further be useful to connect the end edge of the extension 84, at point 86 of Fig. 5, with the lower plate 82 by welding, whereby is obtained a complete gas-tight connection of the plates 82. In this case the angular extension 84 serves as a compensator for expansion. For this, the extension 84 can also be suitably bent in section.

In Fig. 6 is shown the connection of the plates 82 of the gas producer jacket, with the lower edges of the gas producer. The extension 84a is here arranged in a recess 87 of the brickwork.

I have now described my present invention on the lines of a preferred embodiment thereof, but my invention is not limited in all its aspects to the mode of carrying it out as above described and shown, since the invention may be variously embodied within the scope of the following claims.

I claim:

1. Apparatus for continuous production of water-gas by recirculation of a hot mixture of water-gas and steam comprising, a rectangular shaft furnace having fuel charging means at its top and residue discharge means at its bottom and comprising upstanding refractory brickwork walls forming a gasification chamber therein, a lower cellular water-cooled jacket at the bottom of the furnace interposed between the shaft furnace and the residue discharge means for cooling the residue for discharge by said means, vertical brickwork partitions within the chamber of the shaft furnace and supported by the cellular water-cooled jacket and forming residue cells leading to the cooling jacket, a row of horizontal bridges of refractory material above the brickwork partitions spanning the chamber and anchored at their ends in the upstanding walls, and provided with channels therein having ports communicating with the chamber of the shaft furnace, an upper gas offtake leading from the top of the chamber and an intermediate offtake leading from the chamber intermediate the upper gas offtake and the bridges, a gas heater, and connections connecting the upper gas offtake with the inlet of the gas heater to lead recirculation gas thereto, and connections connecting the outlet of the gas heater with the channels in the bridge members for return of recirculation gas to the fuel bed from the gas heater through the bridge channels, said connections including inlet conduits leading through the upstanding walls forming the sides of the chamber of the shaft furnace to the channels in the horizontal bridges.

2. Apparatus as claimed in claim 1 and in which the inlet connections comprise flues in the upstanding walls of the shaft furnace in vertically spaced relationship to the anchoring ends of the bridge members and connected to the channels of the bridge members.

3. Apparatus as claimed in claim 1 and in which the inlet connections comprise flues in the upstanding walls of the shaft furnace in vertically spaced relationship to the anchoring ends of the bridge members and connected to the channels of the bridge members and in which the flues are spaced below the bridges, and in which poker ports are arranged in the upstanding walls above the flues but in proximity to the bridges and in such manner that the spaces between the bridges may be touched by pokers inserted through the poker ports.

4. Apparatus as claimed in claim 1, and in which the shaft furnace outer walls are lined with a gas-tight jacket, said jacket comprising metal sheet plates in relatively movable overlapping relationship at their adjoining edges and having an angular metallic extension integral with the terminal edge of one of the overlapping plates to form a channel for receiving a packing of sealing material to render the joint gas-tight under relative movement.

HEINRICH KOPPERS.